Patented Sept. 26, 1922.

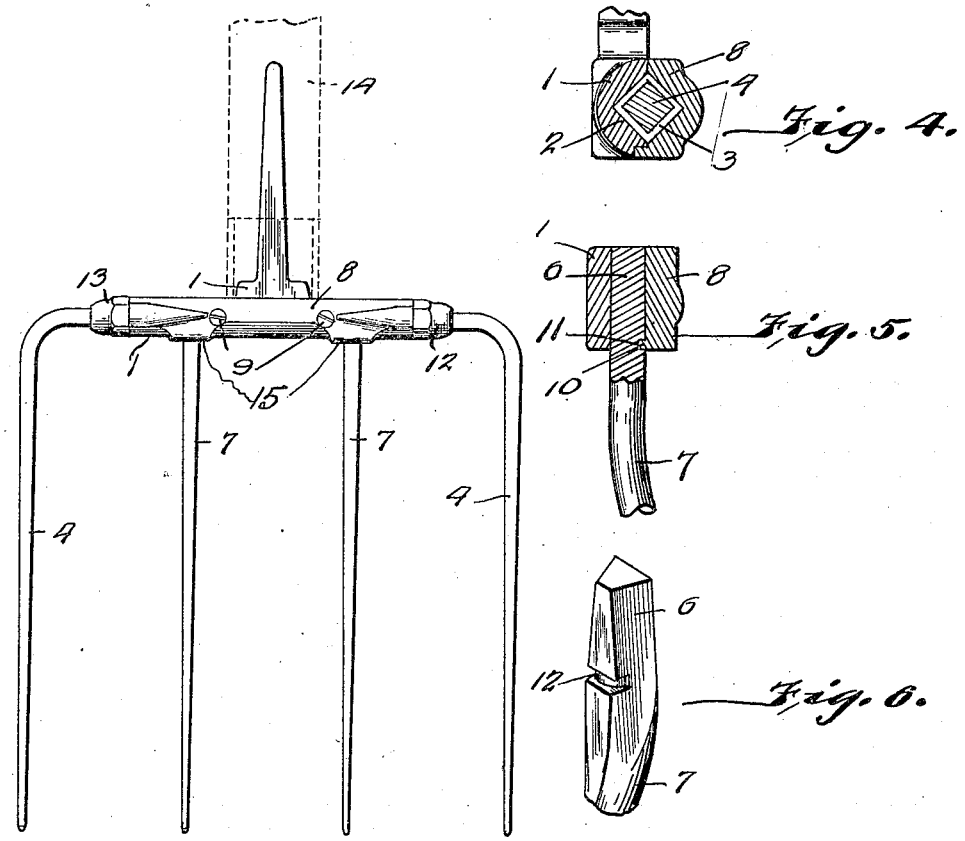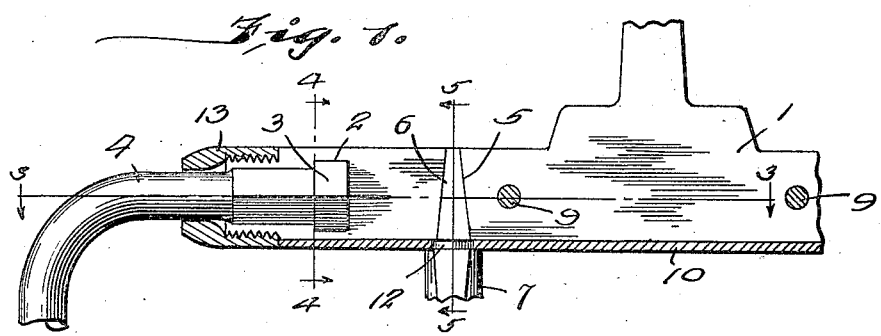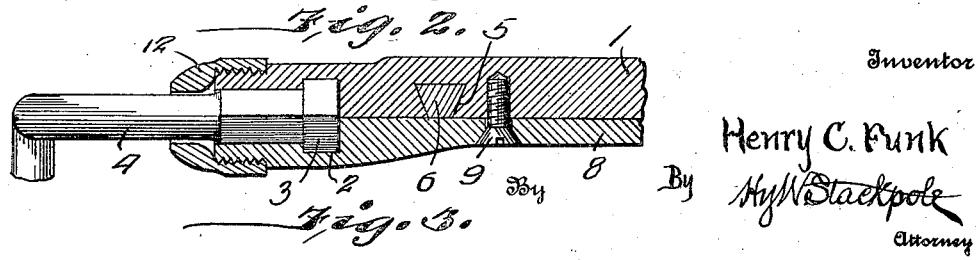

1,430,369

UNITED STATES PATENT OFFICE.

HENRY C. FUNK, OF GRANT TOWNSHIP, RILEY COUNTY, KANSAS.

REMOVABLE-TINE PITCHFORK.

Application filed September 6, 1921. Serial No. 498,654.

*To all whom it may concern:*

Be it known that I, HENRY C. FUNK, a citizen of the United States, residing in Grant Township, in the county of Riley and State of Kansas, have invented certain new and useful Improvements in Removable-Tine Pitchforks, of which the following is a specification, reference being had to the accompanying drawings, which form a part hereof.

My invention relates to improvements in pitchforks in which the tines are removable and the objects are to provide a pitchfork in which the tines may be readily renewed at will and securely fastened in position.

I attain these objects by means of the construction hereinafter described and illustrated in the accompanying drawings, in which,—

Figure 1 is a view of a front elevation of my improved fork complete, the handle being shown only in dotted lines;

Fig. 2, a sectional view of the manner of securing the outer tines in position;

Fig. 3, a sectional view of the same on line 3—3 of Fig. 2;

Fig. 4, a sectional view of the same on line 4—4 of Fig. 2;

Fig. 5, a sectional view on line 5—5 of Fig. 2, of the manner of securing the inner tines in position; and Fig. 6, a detail view of the dovetailed and grooved end of one of the inner tines.

Similar numerals of reference indicate like parts throughout the several views.

The head is divided lengthwise forming main head 1 and face-plate 8. In each end of this head is formed a socket to receive the butt 3 of the outer tine 4. The butt 3 is somewhat enlarged to form a shoulder filling the socket 2. Each end of the closed head is threaded and nut 13 fitted thereon by means of which such head and face-plate are firmly held together. Through this nut passes tine 4 with its butt 3 seated in socket 2, so that, when the two parts of the head are closed as described, such tine is firmly secured in position.

The inner tines 7 have their butts 6 dovetailed, swelling toward the base where they enter the main head 1 to fit the dovetail groove 5 in such head and prevent such tines from being shoved up through the main head when in use. To avoid the inner tines falling out a rib 10 is provided along the lower edge of face-plate 8 and a corresponding recess 12 provided in the butt of such tine engaging such rib when the two parts of the head are joined. Screws 9 are used to hold the parts more closely and firmly together. Shoulders or lugs 15 are formed on the head just around the openings provided for the inner tines, thus stiffening and strengthening the parts. A tong 11 is secured to the head 1 to which to attach a handle 14.

Some of the advantages of my invention are:—Preventing the tines falling out or shoving up through the head, ready removal of the tines and replacing same by others securely held in position.

Having thus described my invention what I claim as new and desire to secure by Letters Patent is,—

1. In a tool of the class described, comprising a head divided lengthwise forming a main head and face-plate, a plurality of tines having grooves in the butts thereof, a corresponding rib on the edge of one portion of said head adapted to engage said grooves when the two portions are brought together with the tines therebetween, means for securing said portions together, and means for attaching a handle thereto.

2. In a tool of the class described consisting of a head divided lengthwise, forming a main head and face plate, a socket in each end of such head, an outer tine to each end having an enlarged butt adapted to fit in said socket, a nut fitting over each end of the head for the purpose of securing said parts together, a plurality of inner tines with dovetailed butts adapted to fit into dovetail grooves in said head, a rib on the edge of one portion of said head adapted to fit into grooves in the butts of said inner tines whereby to hold said tines in position and means for securing a handle to such fork.

3. In a tool of the class described, comprising a head divided lengthwise thereof forming a main head and a face-plate, a socket in each end of such head tines seated in such sockets, a nut fitted to each such end to secure said main head and face-plate together and hold such tines in position, a groove or grooves in said head, each adapted to receive the butt of a tine, a tine fitted thereto and provided with a groove in the butt thereof adapted to be engaged by a rib formed on the edge of one portion of said head whereby to hold said tine in position, a rib formed on the edge of one portion of said head, and means for attaching a handle thereto.

HENRY C. FUNK.

Witnesses:
 ELSIE M. WOODS,
 GEO. L. DAVIS.